United States Patent [19]

Shepherd et al.

[11] 3,857,932
[45] Dec. 31, 1974

[54] DRY HYDROPHILIC ACRYLATE OR METHACRYLATE POLYMER PROLONGED RELEASE DRUG IMPLANTS

[76] Inventors: Thomas H. Shepherd, 12 N. Greenwood Ave., Hopewell, N.J. 08525; Francis E. Gould, 29 Cedar Ln., Princeton, N.J. 08540

[22] Filed: June 27, 1972

[21] Appl. No.: 266,631

Related U.S. Application Data

[60] Division of Ser. No. 70,829, Sept. 9, 1970, abandoned, Continuation-in-part of Ser. Nos. 766,840, Oct. 11, 1968, Pat. No. 3,577,512, and Ser. No. 654,044, July 5, 1967, abandoned, and Ser. No. 650,259, June 30, 1967, abandoned, and Ser. No. 567,856, July 26, 1966, Pat. No. 3,520,949.

[52] U.S. Cl.................... 424/19, 424/22, 424/81, 128/260
[51] Int. Cl............................................. A61k 27/12
[58] Field of Search ........................... 424/19–22, 424/81

[56] References Cited
UNITED STATES PATENTS

| | | | |
|---|---|---|---|
| 2,413,419 | 12/1946 | Saunders et al. | 424/22 |
| 2,625,158 | 1/1953 | Lee et al. | 128/260 |
| 3,220,960 | 11/1965 | Wichterle et al. | 260/2.5 |
| 3,499,445 | 3/1970 | Reed | 128/260 |
| 3,551,556 | 12/1970 | Kliment et al. | 424/21 |
| 3,565,991 | 2/1971 | Short | 424/243 |
| 3,577,512 | 5/1971 | Shepherd et al. | 424/21 |

*Primary Examiner*—Shep K. Rose
*Attorney, Agent, or Firm*—Cushman, Darby & Cushman

[57] ABSTRACT

A shaped body in vivo implantation dosage form which is a dry composition containing a therapeutically active material and a water insoluble hydrophilic acrylate or methacrylate polymer selected from the group consisting of polymers of hydroxy lower alkyl acrylates, hydroxy lower alkyl methacrylates, hydroxy lower alkoxy lower alkyl acrylates and hydroxy lower alkoxy lower alkyl methacrylates, said shaped body being formed by casting or molding an anhydrous casting syrup or solution of the therapeutic material and the hydrophilic acrylate or methacrylate and polymerizing the composition, the resulting cast or molded dosage form having the advantage of preventing deterioration or loss of potency and thereby extending the shelf life of the therapeutic.

5 Claims, No Drawings

DRY HYDROPHILIC ACRYLATE OR METHACRYLATE POLYMER PROLONGED RELEASE DRUG IMPLANTS

This is a division of application Ser. No. 70,829, filed Sept. 9, 1970, now abandoned, which is a continuation-in-part of application Ser. No. 766,840, filed Oct. 11, 1968, now U.S. Pat. No. 3,577,512, issued May 4, 1971, application Ser. No. 654,044, filed July 5, 1967 and now abandoned, application Ser. No. 650,259, filed June 30, 1967, now abandoned, and application Ser. No. 567,856, filed July 26, 1966, now U.S. Pat. No. 3,520,949, issued July 21, 1970.

This invention relates to sustained release tablets which are designed in a stabilized form to meet predetermined rates of release of a therapeutic substance contained therein.

In recent years, sustained release tablets have been used extensively in the treatment of various illnesses. Perhaps the most well known use is that of antihistamines in treating the common cold. The main advantages of such tablets lie in the fact that they minimize the number of times a patient is required to take medication during a given day and, perhaps more importantly, ensure constant absorption of therapy over a given time period, thus avoiding peaks and valleys in the control of chronic and acute maladies.

One of the most commonly employed methods for obtaining a so-called "prolonged" therapeutic effect from a pharmaceutical formulation is to combine the active ingredients during the manufacturing process with one or more inert components in such a fashion that the release of the active drug from the total pharmaceutical mass during its passage through the stomach and intestinal tract, is even and gradual. Among inert components which are presently being used for such purposes are high molecular weight waxes, used singly or in various combinations, either evenly distributed among the active ingredients or first melted and then carefully coated over small particles of the active components.

One disadvantage in the use of waxes for long-acting tablet formulations is that a relatively large mass of wax must be incorporated in the dosage form to give the desired long-acting effect. In other words, the ratio of wax to active component is a several-fold factor, thus requiring the manufacture of such a bulky tablet that its ingestion by patients is relatively difficult and uncomfortable.

The use of alkaline earth metal salts of fatty acids in tablet manufacture is known. These substances have been used for many years as tablet lubricants. That is to say, they are incorporated in the final tablet granulation just prior to compression in relatively small quantities in order to facilitate compression of the granules without their adherence to the punches and dies in the tabletting machine.

It is also known that saturated fatty acids themselves, their esters, ethers and alcohols, can be pelletized with polyvinylpyrrolidone by converting the polymer, in the presence of the fatty acid or its derivative, into a molten mass, granulating the congealed mass, reheating, cooling, adding the therapeutic and pelletizing at a temperature near the set point.

Among the many disadvantages in using fatty acids or their derivatives in combination with polyvinylpyrrolidone to prepare prolonged action dosage unit forms in their physical similarity to high molecular weight waxes. In order to get uniform distribution in polyvinylpyrrolidone, the fatty acid derivatives must be melted in the presence of the latter, granulated, remelted and then pelletized. This not only constitutes an unwieldly, lengthy and expensive process but also, because of the dual high temperature involvement, limits the process to incorporation only of those therapeutically active agents which can safely withstand elevated temperature exposure without decomposition. Thus, as in the case of most high molecular weight waxes, the long chain fatty acids and their derivatives are not susceptible to conventional wet granulation at room temperature.

In addition to the above, because of their physical character, large quantities of the fatty acid substances must be employed to obtain the desired effect. Thus the proportion of P.V.P. to fatty acid material must be about one to seven, or more. Moreover, it is known that the fatty acids themselves are inadequate as long-acting vehicle matrices, even though combined with P.V.P. Thus it is frequently necessary, in order to obtain the desired prolonged effect, to incorporate a quantity of high molecular weight wax, such as candelilla, beeswax or carnauba in the formulation. This adds still further to the bulkiness of the dosage form, unnecessarily increasing the volume of the total mass and making the oral ingestion of the medication that much more difficult.

It is an object of this invention to produce stable forms of therapeutic agents which can be designed to possess definite time release characteristics.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These and other objects of the invention are accomplished by making a dosage unit combination of a hydrophilic polymeric material which is insoluble and non-assimilable in a biological system and a therapeutic substance which can be leached from the combination to provide an intended effect on the system. The hydrophilic polymer can be admixed with the therapeutic and/or employed as a coating therefor. Preferably, it is employed as a coating, whether or not it is employed also admixed with the therapeutic.

The hydrophilic monomer employed is a hydroxy lower alkyl acrylate or methacrylate, or hydroxy lower alkoxy lower alkyl acrylate or methacrylate, e.g. 2-hydroxyethyl acrylate, 2-hydroxyethylene methacrylate, diethylene glycol monoacrylate, diethylene glycol monomethacrylate, 2-hydroxypropyl acrylate, 2-hydroxypropyl methacrylate 3-hydroxypropyl acrylate, 3-hydroxypropyl methacrylate and dipropylene glycol monomethacrylate. The preferred monomers are the hydroxyalkyl acrylates and methacrylates, most preferably 2-hydroxyethyl methacrylates.

While homopolymers can be employed in the invention, for best results a cross-linked copolymer is employed. Preferably, the cross-linking agent is present in an amount of 0.1 to 2.5%, most preferably not over 2.0%, although from 0.05 to 15%, or even 20%, of cross-linking agents can be used. Of course, care should be taken that cross-linking agents are not used in an amount which renders the product toxic.

Typical examples of cross-linking agents include ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl malate, divinyl tartrate, triallyl melamine, N,N'-methylene bis acrylamide, glycerine trimethacrylate, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1,3,5-triacryltriazine, triallyl phosphite, diallyl ester of benzene phosphonic acid, polyester of maleic anhydride with triethylene glycol, polyallyl glucose, e.g. triallyl glucose, polyallyl sucrose, e.g. pentaallyl sucrose, sucrose diacrylate, glucose dimethacrylate, pentaerythritol tetraacrylate, sorbitol dimethacrylate, diallyl aconitate, divinyl citraconate, diallyl fumarate.

Polymerization can be carried out by various procedures. Thus the polymer can be formed as a casting syrup and then cured. Alternatively, the hydrophilic polymers are prepared by suspension polymerization of the hydrophilic monomer, including the cross-linking agent and stopping the polymerization when the polymer formed will precipitate in water but is still soluble in highly polar organic solvents such as alcohols, glycols and glycol ethers. Examples of suitable solvents are ethyl alcohol, methyl alcohol, isopropyl alcohol, ethylene glycol, propylene glycol, diethylene glycol, dipropylene glycol, monomethyl ether of ethylene glycol, dimethyl formamide, dimethyl sulfoxide and tetrahydrofurane.

The suspension polymerization is carried out in a non-polar medium such as silicone oil, mineral oil, xylene, etc.

The polymer formed in the suspension polymerization or obtained from the casting syrup, either directly or after precipitation with water, is then dissolved in the appropriate solvent as indicated above and can be admixed with the pharmaceutical, the solvent removed and, if necessary, the polymerization completed. Alternatively, the solvent containing polymer solution can be coated on a pharmaceutical entrapped in solvent insoluble hydrophilic polymer and the solvent removed to form a film or coating for the entrapped material.

When the casting syrup is employed, polymerization can be carried out until a solid is formed with or without pharmaceutical entrapped therein. If the cast material is to be employed as a coating for a pharmaceutical rather than merely being in admixture therewith, the central portion of the casting is hollow and an entrance to the hollow portion is provided, either by the shape of the initial casting or simply by cutting a hole therein, the pharmaceutical inserted, and the aperture closed with more partially cured polymer followed by completion of the cure.

The casting syrup is cured to form products which exist in a solid state, e.g. rigid state, and can be swollen. The polymer obtained from the cured liquids has reversible fluid absorption properties, the ability to retain its shape in a fluid absorption media and to elastically recover its shape after deformation.

As catalysts for carrying out the polymerization, there is employed a free radical catalyst in the range of 0.05 to 1% of the polymerizable hydroxyalkyl ester or the like. The preferred amount of catalyst is 0.1 to 0.2% of the monomer. Usually, only a portion of the catalyst, e.g. 10-20% is added initially to the monomer and the balance is added to the solution or casting syrup after partial polymerization. Typical catalysts include t-butyl peroctoate, benzoyl peroxide, isopropyl percarbonate, methyl ethyl ketone peroxide, cumene hydroperoxide, and dicumyl peroxide. Irradiation, e.g., by ultra violet light or gamma rays, also can be employed to catalyze the polymerization. Polymerization can be done at 20° to 150°C., usually 40° to 90°C.

The resulting polymers can be prepared in the form of films or rods suitable for grinding into fine powders. By admixing foaming agents such as sodium bicarbonate with the reactants prior to curing, the polymer may be obtained in the form of a foam which is easily disintegrated into a fine powder by means of a shearing action. Quantities of 1 to 10 grams foaming agent, e.g. 2 grams of sodium bicarbonate, per 100 grams of reactants have been found to be sufficient.

Polymeric powders prepared by any of the above means are mixed with the desired therapeutic substances, dissolved in an appropriate solvent if necessary, and the mixture placed on a mechanical roller so that the solution becomes intimately mixed. The solution is then filtered and dried by air evaporation or forced heat. Upon evaporation of the solvent, the therapeutic substance is retained by the powder. Due to its extreme hydrophilicity and because the hydrophilic polymer of this invention has reversible fluid absorption properties, the powders can be reconstituted in a biological system so that the therapeutic substance is leached from the polymer to accomplish its intended effect.

The therapeutically active materials useful in the dosage units of the invention may include, for example, antibiotics, such as penicillin, tetracycline, Terramycin (hydroxytetracycline), Aureomycin (chlorotetracycline) and Chloromycetin (chloramphenicol); seditives and hypnotics such as pentabarbital sodium, phenobarbital, butabarbital, amobarbital, secobarbital sodium, codeine, Bromisovalum, cabromal and sodium phenobarbital; hypotensives and vasodilators such as pentaerythritol tetranitrate, erythrityl tetranitrate and nitroglycerin; amphetamines such as dlamphetamine sulfate and dextroamphetamine sulfate, hormones such as dienestrol, ethynyl estradiol, diethylstilbestrol, estradiol, methyltestosterone and progesterone; cortisone; vitamins, e.g. Vitamin E, Vitamin K, Vitamin $B_1$, Vitamin $B_2$ and Vitamin C; and tranquilizers such as reserpine, chlorpromazine hydrochloride and thipropazate hydrochloride, prednisolone, pentylene tetrazole, N-acetyl p-amino phenol, alkaloids of belladonna, atropine sulfate, hyoscine hydrobromide, hyoscyamine $SO_4$, chlorpheniramine maleate, phenylephedrine, quinidine salts, theophylline salts, ephedrine salts, pyrilamine maleate, quaiacol-glyceryl-ether-theophyllinate, etc. The therapeutic is normally present in finely divided form.

The sustained release tablets of this invention may be taken orally or implanted subcutaneously.

The novel formulation of this invention comprises a dosage unit combination capable of releasing incorporated medication generally over a controlled period of time. The rate of release for the most part will be determined by the ratio of the hydrophilic polymer to the medicament, by the sequence or thickness of the coatings which are envisioned by the invention, or by the presence of a blocking layer between the active substances. Blocking layers used in the invention may be any of those ingestible materials conventionally employed including waxes such as beeswax, carnauba wax, Japan wax, paraffin, bayberry wax, higher fatty acids, such as oleic acid, palmitic acid and stearic acid, esters of such higher fatty acids such as glyceryl tristearate, cetyl palmitate, diglycol stearate, glycerly myristate, triethylene glycol monostearate, higher fatty alcohols such as cetyl alcohol and stearyl alcohol, and high molecular weight polyethylene glycols such as the carbowaxes, polyethylene glycol mono-stearate, polyethylene glycol distearate, polyoxyethylene stearate, glyceryl monostearates and mixtures thereof.

Most preferably the blocking agent is made of the hydrophilic polymers of the present invention, the cross-linked polymers being most preferred. The blocking layer or the coating layer can be 0.1 to 5 mils thick to retard the diffusion or the inner therapeutic. The thickness can be chosen for any desired time delay.

Unless indicated, all parts and percentages are by weight.

The following examples will further illustrate the invention:

EXAMPLE 1

Suitably purified 2-hydroxy ethyl methacrylate (100 g) is stirred with 0.15 g. isopropyl percarbonate in an anaerobic atmosphere at ambient temperature. Ethylene glycol dimethacrylate in the concentration of 0.1g/100g. 2-hydroxy ethyl methacrylate is added.

Phenoxymethyl penicillin, an antibiotic, is dissolved in ethyl alcohol, and added to the mixed methacrylate solution in an amount to provide for gradual release of 1,200,000 units per gram of casting syrup. The resulting casting syrup is set aside as a stock solution for later casting or other use. The casting syrup and the resulting cast product either in shaped or powdered form are employed as a pharmaceutical carrier for the antibiotic. The use of the casting syrup or resulting shaped or powdered preparation has the advantage that it prevents deterioration and loss of potency to which the antibiotic is subject in conventional pharmaceutical carriers, thereby extending the shelf life or expiration date of the antibiotic preparation. In addition, the hydrophilic polymer prepared in accordance with the present invention has the desirable characteristics, whether dry or solvent filled, of preventing the imbibition with microbial and fungal contaminants, such as gram negative and gram positive micro-organisms, yeast, molds and viruses. This characteristic is of particular importance in the presence of contaminants, such as preventing contamination of penicillin with various yeast forms.

The polymerization of the casting syrup to a solid can then be completed, e.g. by adding 0.3 g. of further isopropyl percarbonate and heating to 40°C. The product can serve as the core 3 in FIG. 2 and a similar casting syrup omitting the phenoxymethyl penicillin can serve as the outer coating 4.

EXAMPLE 2

In 3 cc. of 2-hydroxy ethyl methacrylate containing 0.2% of ethylene glycol dimethacrylate and 0.15% tertiary butyl peroctoate was dissolved 100 milligrams of norethandrolone (Nilevar). The solution was cast in the form of a cylinder 1 cm. by 3 cm. and was polymerized at 80°C. for 3 hours in a nitrogen atmosphere. After removing from the mold, a cylinder suitable for in vivo implantation to provide prolonged release of the norethandrolone (Nilevar) was obtained for use in animal husbandry.

EXAMPLE 3

Distilled 2-hydroxy ethyl methacrylate (100 g.) is stirred with 0.1 g. tertiary butyl peroctoate in an anaerobic atmosphere at 25°–70°C. for 15–40 minutes. The resultant mixture is cooled to 25°C. and tertiary butyl peroctoate added so as to make the total concentration of tertiary butyl peroctoate in the system 0.2/100 grams of 2-hydroxy ethyl methacrylate. Ethylene glycol dimethacrylate, in a concentration of 0.2 g./100 g. of 2-hydroxy ethyl methacrylate is added at the same time as the catalyst concentration is brought up to the theoretical content.

100 g. of the resulting syrup was added to three times its volume of water with vigorous agitation. The white precipitate so obtained was isolated by filtration and dried to yield 9.0 g. of polymer showing an intrinsic viscosity of 1.03 when dissolved in absolute methanol.

Discs of hydrophilic polymer, prepared as shaped articles from this solution, measuring one-fourth inch in diameter and 0.05 mm. in thickness, were saturated with an antibiotic solution of lincomycin hydrochloride monohydrate (Lincocin) and tested against standard staphylococcic strains on agar plates. The zones of inhibition were compared with standardized 1 mg. discs obtained from the manufacturer. Multiple transfers of the hydrophilic polymer also were made on blood agar to determine how long the elution of the antibiotic from the gel would take place.

It was observed that inhibition of the standard bacterial strain occurred up to 22 days. Comparable paper discs with the same antibiotic exhibited zones of inhibition only for 48 hours. In some cases 6 transfers of the discs, each to a fresh blood agar plate, were carried out. From the results, it was apparent that the elution of the agent from the hydrophilic polymer disc is a gradual process and extends over a significant period of time. Moreover, it appears that it is possible to heavily saturate the gel with the desired agent.

EXAMPLE 4

Into a flask equipped with an agitator and a heating mantle was charged 1000 grams of silicone oil, 100 grams of 2-hydroxy ethyl methacrylate and 0.33 grams of isopropyl percarbonate. The flask was placed under a nitrogen atmosphere and the contents were rapidly agitated and heated to 100°C. After 15 minutes at 100°C., the polymer slurry obtained was filtered hot to isolate the polymer. The polymer powder was reslurried in 300 ml. of xylene, filtered and dried.

3.6 grams of the powder was imgregnated with 0.008 g. of N,N-dimethyl aniline by wetting the powder with an acetone solution of dimethyl aniline and allowing the mixture to dry.

In a seperate container, 9.9 g. of 2-hydroxyethyl methacrylate is mixed with 0.0214 gram of ethylene glycol dimethacrylate and 0.05 gram of benzoyl peroxide.

3.6 g. of the impregnated powder, when mixed with 9.9 g. of the formulated hydroxyethyl methacrylate mixture formed a paste mixture. The mixture was cast and cured to form a hollow cylinder 50 mm long, with an outside diameter of 5 mm and walls 0.5 mm thick. The hollow interior of the cylinder was filled wtih 150 mg. of norethandrolone (Nilevar), the hole sealed with further casting polymer, and the cylinder submerged in a methanol/water solution so as to test its release rate. A flat release curve of 10 mg. per 24 hours was observed.

The following examples illustrate the preparation of other hydrophilic casting or coating syrups which can be employed to make the coat 2 of FIG. 1, coat 4 of FIG. 2, coat 8 of FIGS. 4 and 5, coat 10 of FIG. 5 or the pharmaceutical containing mixture shown at 3 in FIG. 2, at 5 and 6 in FIG. 3 and at 7 and 9 in FIGS. 4 and 5.

EXAMPLE 5

A solution was made of 100 parts of 2-hydroxyethyl acrylate, 0.2 parts of ethylene glycol dimethacrylate and 0.4 parts of t-butyl peroctoate and then cast into a mold and polymerized.

EXAMPLE 6

A solution was made of 100 parts of an isomeric mixture of hydroxyisopropyl methacrylates, 0.2 part propylene glycol dimethacrylate and 0.4 part of t-butyl peroctoate and then cast into a mold and polymerized.

EXAMPLE 7

100 parts of 2-hydroxyethyl methacrylate was stirred with 0.05 part of t-butyl peroctoate in a nitrogen atmosphere at a temperature of 40°C. for 30 minutes. The resultant mixture was cooled to 25°C. and t-butyl peroctoate added so as to make the total amount of t-butyl peroctoate added in the system 0.15 part. 0.1 part of ethylene glycol dimethacrylate was also added along with the second addition of the t-butyl peroctoate and cast.

EXAMPLE 8

The process of Example 7 was repeated, substituting 0.2 part of 1,3-butylene glycol dimethacrylate in place of the ethylene glycol dimethacrylate as the cross-linking monomer.

EXAMPLE 9

100 parts of 2-hydroxyethyl methacrylate was stirred with 50 parts of distilled water and 0.1 part of t-butyl peroctoate in an anaerobic atmosphere at a temperature of 40°C. for 20 minutes. The water was removed, alcohol added as a solvent and the resultant mixture was cooled to 25°C. and 0.05 part of t-butyl peroctoate added and at the same time was added 0.2 part of ethylene glycol dimethacrylate as a cross-linking monomer. The product was then polymerized to form a coating solution.

EXAMPLE 10

The process of Example 9 was repeated in the absence of water or alcohol to give a casting syrup.

EXAMPLE 11

The process of Example 10 was repeated but the initial catalyst consisted of a mixture of 0.05 part t-butyl peroctoate and 0.1 part of isopropyl percarbonate. The added catalyst was 0.05 part of isopropyl percarbonate.

EXAMPLE 12

100 parts of distilled 2-hydroxyethyl methacrylate was stirred with 0.1 gram of t-butyl peroctoate in an anaerobic atmosphere at 70°C. for 40 minutes. The resultant mixture was cooled to 25°C. and t-butyl peroctoate added so as to make the total concentration of t-butyl peroctoate in the system 0.2 part per 100 parts of 2-hydroxyethyl methacrylate. Ethylene glycol dimethacrylate in the concentration of 0.2 part per 100 parts of 2-hydroxyethyl methacrylate was added at the same time as the cataylst concentration was increased to give a casting liquid.

EXAMPLE 13

The process of Example 12 was followed, substituting hydroxypropyl methacrylate for the 2-hydroxyethyl methacrylate.

EXAMPLE 14

The process of Example 12 was followed using isopropyl percarbonate as the catalyst and substituting 1,3-butylene glycol dimethacrylate for the ethylene glycol dimethacrylate as the cross-linking monomer.

EXAMPLE 15

Suitably purified 2-hydroxyethyl methacrylate was stirred with 0.15 part of isopropyl percarbonate in an anaerobic atmosphere at ambient temperature. Ethylene glycol dimethacrylate in the concentration of 0.1 part per 100 parts of 2-hydroxyethyl methacrylate was added and the mixture heated to 40°C. for 20 minutes to form a casting syrup.

EXAMPLE 16

100 parts of 2-hydroxyethyl methacrylate was stirred with 0.05 part t-butyl peroctoate in a nitrogen atmosphere at a temperature of 30°C. for 30 minutes. The resultant mixture was cooled to 25°C. and additional peroctoate added to make up a total of 0.15 part, there being added at the same time 0.1 part of ethylene dimethacrylate.

EXAMPLE 17

100 parts of 2-hydroxyethyl methacrylate was mixed with 0.20 part of t-butyl peroctoate in an inert atmosphere and 0.20 part of ethylene glycol dimethacrylate was added and the mixture heated at 50°C. for 15 minutes to form a casting syrup.

EXAMPLE 18

100 parts of 2-hydroxyethyl methacrylate was stirred with 0.1 part of t-butyl peroctoate and 0.15 part of ethylene glycol dimethacrylate was added and the mixture heated to 40°C. for 25 minutes to form a casting syrup.

EXAMPLE 19

100 parts of purified 2-hydroxyethyl methacrylate was mixed with 15 parts of ethylene glycol dimethacrylate and 0.3 parts of t-butyl peroctoate and the mixture heated at 40°C. for 30 minutes to form a casting syrup.

EXAMPLE 20

In a 5 gallon resin kettle, there was placed 10 kilograms of 2-hydroxyethyl methacrylate, 150 grams of ethylene glycol dimethacrylate and 4.0 grams of t-butyl peroctoate. The kettle was heated to 95°C. with stirring over a 50 minute period, whereupon the reaction mixture was rapidly cooled, yielding a syrup having a viscosity of 420 centipoises at 30°C. To the syrup was added 20 grams of ethylene glycol dimethacrylate and 20 grams of t-butyl peroctoate, and the syrup was stirred until a homogenous solution was obtained. This syrup was useful in casting coatings of the type shown in the drawings.

EXAMPLE 21

The procedure of Example 20 was repeated replacing the ethylene glycol dimethyacrylate by an equal weight of divinyn benzene. The resulting syrup was also useful in forming castings for use in forming coated pharmaceuticals.

EXAMPLE 22

The casting syrup of Example 3 is employed as a base solution to which is added ethynodiol diacetate as the progestagen component plus mestranol as the estrogen component in an amount sufficient to provide a timed daily release time of 10 to 1 parts by weight, respectively, when the casting syrup is prepared in the form of a shaped body or in powdered form. The resulting preparation is used as a body implant, or tablet for oral administration for contraception or in other therapy for fertility regulation or disturbance. One advantage of the use of the instant hydrophilic polymers as pharmaceutical carriers is that it permits a desired slow release or timed release of the active component. The release time is adjusted readily by the amount of cross-link agent employed, the surface to volume ratio of the formed plastic, and the concentration or concentration gradient of the biologically active substance as incorporated. Release rate is increased by inclusion of solvent in the casting solution.

The techniques for implanting hormone containing pellets, tablets, etc. in animal husbandry is well known, for example as shown in Dzink, Endocrinology, Vol. 78, January, 1966, pages 208-216, Hammond, Endocrinology, Vol. 49, Sept., 1951, pages 384-389, Troelsen, Jour. of Animal Science, Vol. 25 (1966) pages 161-166.

As used in the present claims, the term tablet is intended to cover pills.

What is claimed is:

1. A shaped body in vivo implantation dosage form which is a dry composition containing a therapeutically active material and a water insoluble hydrophilic acrylate or methacrylate polymer selected from the group consisting of polymers of hydroxy lower alkyl acrylates, hydroxy lower alkyl methacrylates, hyroxy lower alkoxy lower alkyl acrylates and hydroxy lower alkoxy lower alkyl methacrylates, said shaped body being formed by casting or molding an anhydrous casting syrup or solution of the therapeutic material and the hydrophilic acrylate or methacrylate and polymerizing the composition, the resulting cast or molded dosage form having the advantage of preventing deterioration or loss or potency and thereby extending the shelf life of the therapeutic.

2. A shaped body in vivo implantation dosage form according to claim 1 providing prolonged release of a medicament comprising a medicament homogeneously dispersed in a copolymer of a major amount of 2-hydroxyethyl methacrylate and a minor amount of ethylene glycol dimethacrylate, wherein said copolymer is molded in the form of the shaped body by in situ mold polymerization of an anhydrous solution of said monomers with said medicament dissolved therein, in the presence of a catalytic quantity of a polymerization initiator.

3. A shaped body according to claim 1 which is in the form of a cylinder.

4. A shaped body according to claim 1 wherein the polymer is organic solvent soluble.

5. A solid rod shaped polymer suitable as an in vivo body implant to provide prolonged release of a medicament comprising a medicament homogeneously dispersed in a copolymer of a major amount of 2-hydroxyethyl methacrylate and a minor amount of ethylene glycol dimethacrylate, wherein said copolymer is molded in the form of the shaped body by in situ mold polymerization of an anhydrous solution of said monomers with said medicament dissolved therein, in the presence of a catalytic quantity of a polymerization initiator.

* * * * *